United States Patent
Velazquez et al.

(10) Patent No.: US 8,356,316 B2
(45) Date of Patent: Jan. 15, 2013

(54) METHOD, SYSTEM AND COMPUTER PROGRAM PRODUCT FOR AN EMERGENCY ALERT SYSTEM FOR AUDIO ANNOUNCEMENT

(75) Inventors: Leonardo Velazquez, Plano, IL (US); James Ford, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 446 days.

(21) Appl. No.: 12/640,529

(22) Filed: Dec. 17, 2009

(65) Prior Publication Data
US 2011/0154391 A1 Jun. 23, 2011

(51) Int. Cl.
*H04N 7/025* (2006.01)
(52) U.S. Cl. .......................................... 725/33
(58) Field of Classification Search ............... 725/32–33
See application file for complete search history.

(56) References Cited

U.S. PATENT DOCUMENTS

| | | | |
|---|---|---|---|
| 5,611,066 A | 3/1997 | Keele | |
| 5,907,793 A | 5/1999 | Reams | |
| 6,020,913 A | 2/2000 | Bush | |
| 2003/0093530 A1* | 5/2003 | Syed | 709/226 |
| 2005/0071763 A1* | 3/2005 | Hart et al. | 715/731 |
| 2006/0040639 A1 | 2/2006 | Karl | |
| 2007/0136743 A1* | 6/2007 | Hasek et al. | 725/33 |
| 2007/0252688 A1* | 11/2007 | Eisold et al. | 340/506 |
| 2007/0275690 A1* | 11/2007 | Hunter et al. | 455/404.2 |
| 2008/0194225 A1* | 8/2008 | Tischer et al. | 455/404.2 |
| 2009/0227224 A1 | 9/2009 | Aftelak | |
| 2009/0235305 A1* | 9/2009 | Pugel | 725/33 |
| 2010/0211972 A1* | 8/2010 | Howarter et al. | 725/33 |
| 2010/0324958 A1* | 12/2010 | Stiles et al. | 705/7 |

* cited by examiner

*Primary Examiner* — Farzana Hossain
(74) *Attorney, Agent, or Firm* — G. Michael Roebuck (57) ABSTRACT

A method is disclosed for distributing emergency alert audio data, the method including but not limited to receiving emergency alert message (EAM) data at an encoder/decoder in an internet protocol television (IPTV) system; sending the EAM to an emergency alert control (EAC) server in the IPTV system; verifying at the EAC that a valid audio message is received in the EAM; if the EAM contains an audio file, creating a MP3 audio file from or another acceptable format for the audio file; and if the received EAM is a state/local alert, placing the EAM in first-in-first-out order in a message delivery queue for delivery to end user devices in the order of the message delivery queue, else, if a streaming playback of state/local alert message is in progress, suspending the streaming playback of the state/local alert message, and continuously streaming the received EAM to end user device in the IPTV system.

9 Claims, 6 Drawing Sheets

METHOD, SYSTEM AND COMPUTER PROGRAM PRODUCT FOR AN EMERGENCY ALERT SYSTEM FOR AUDIO ANNOUNCEMENT

FIELD OF THE DISCLOSURE

The present disclosure relates to the audio announcements for safety alerts.

BACKGROUND OF THE DISCLOSURE

The Emergency Alert System (EAS) is a national public warning system that requires broadcasters, cable television systems, wireless cable systems, wireline video providers, satellite digital audio radio service providers and direct broadcast satellite service providers to make their communications facilities available to the President during a national emergency. The system also may be used by state and local authorities to deliver important emergency information such as severe weather warnings targeted to specific geographical regions or areas.

DETAILED DESCRIPTION

In an illustrative embodiment, IPTV service providers retransmit recorded and streaming audio received on the emergency alert system (EAS) encoders to end user devices in their internet protocol television (IPTV) network. In a particular illustrative embodiment, once an EAS message has been validated, the EAS Encoder/Decoder (ENDEC) will identify if there is an audio alert included in the EAS message, the EAS ENDEC will record the audio content and generate the appropriate EAS text message. Subsequently, the ENDEC will forward the valid EAS information to the EAS Controller (EAC). The EAC will receive the new alert message from the ENDEC and will insert the alert messages into the incoming queue EAS messages received for distribution. The EAC will continually receive and queue new EAS alert message no matter what other processes are running. While an illustrative embodiment discusses an MP3 audio file format or any other acceptable format for the audio file creating a MP4, WAV, etc. audio file from or another acceptable format for the audio file.

New regular EAS messages will not be pulled off of the incoming queue and distributed until all EAS messages in progress of being distributed are complete (unless an EAN is received). Thus the EAC controls when the messages are sent to the STBs and will calculate the time before the EAS alerts are delivered to customers' end user devices.

An illustrative embodiment provides a method, system and computer program product video service providers can use this invention disclosure to enhance their EAS messages by allowing audio to be retransmitted in addition of EAS message text. These enhancements include the ability to support EAS streaming audio in the IPTV system and the ability to support multilingual audio. IPTV service providers should be able to transmit recorded and streaming audio received on the EAS encoders. In a particular illustrative embodiment, when the EAS message has been validated, the EAS ENDEC will identify if there is an audio alert included, will record the content and generate the appropriate EAS text message. Subsequently, the ENDEC will forward the valid EAS information to the EAS Controller (EAC). The EAC will receive the new alert messages from the ENDEC and will insert them into the incoming queue. The EAC will continually receive and queue new alerts no matter what other processes are running. The EAC will convert the EAS alert message audio file to an MP3 audio file or any other acceptable audio format, including but not limited to MP4, and will calculate the audio start time and audio message duration. Messages will be played back in the order that they were received except for EAN alerts (national alerts). An EAN will be processed immediately and not inserted into any queue. New regular EAS (state/local) messages will not be pulled off of the incoming queue for distribution until all messages in progress are complete (unless an EAN is received). The EAC controls when the messages are sent to the STBs and will calculate the time before the EAS alerts are delivered to customers.

A particular illustrative embodiment provides a system, method and computer program product that enables customers to be able to listen to the audio information of emergency alert messages over an end user device by receiving EAS alert message data from an IPTV system. The EAS implementation is based on the current broadcast system for the alert distribution and delivery of EAS messages to the national channels and the complete non-linear IPTV experience (pay per view (PPV), video on demand (VOD), Interactive Menu, etc. . . . ). EAS messages are relayed from Primary Entry Points (PEP) stations, to local provider radio stations as audio signals using Specific Area Message (SAME) encoding. The audio signals contain Frequency Shift Keyed (FSK) data, as well as in human voice message audio data. The audio signals are carried on the normal audio channel of each station, temporarily replacing the music or voice of the station. Each station has an EAS Encoder/Decoder to be able to receive and transmit the EAS message. The EAS Header contains SAME codes that the ENDEC uses to determine the time, location and severity of the message, the ENDEC is using this data to relay the information to the STBs and successfully display the EAS alert information in the overlay text. In a particular illustrative embodiment, an IPTV system transmits the audio message as well as the text. In another illustrative embodiment, the system, method and computer program product are language independent so that EAS alert messages are sent to the clients in multiple text and audio languages. In another particular embodiment, visual icons indicating the nature of the emergency are transmitted along with the EAS alert message to end user devices. The EAC determines the nature of the emergency (flood, earthquake, tornado, snow, chemical spill, etc.) and places an icon in the message that visually indicates that nature.

In another particular illustrative embodiment, a method is disclosed for distributing emergency alert audio data, the method including but not limited to receiving emergency alert message data at an encoder/decoder in an internet protocol television (IPTV) system; validating headers in the emergency alert message; sending the validated emergency alert message to a emergency alert control (EAC) server in the IPTV system; verifying at the EAC that a valid audio message is received in the emergency alert message; if the emergency alert message contains an audio file, creating a MP3 audio file from the audio file; and if the received emergency alert message is a state/local alert, placing the emergency alert message in first-in-first-out order in a message delivery queue for delivery to end user devices in the order of the message delivery queue, else, if a streaming playback of state/local alert message is in progress, suspending the streaming playback of the state/local alert message, and continuously streaming the received emergency alert message to end user device in the IPTV system.

In another embodiment of the method, the method further includes but is not limited to calculating a start and stop time for delivering the audio data in emergency alert message based on the maximum time to deliver and present the audio data in emergency alert message in a language in which the emergency alert message is delivered, time to complete multicast joins for the end users receiving the emergency alert message and network time protocol (NTP) tolerance. In another embodiment of the method, the audio data further includes but is not limited to multimedia data, and wherein calculating the time to deliver the audio data in the emergency alert message further includes but is not limited to calculating the duration of the multimedia message data in the emergency alert message, wherein the multimedia message further includes but is not limited to data selected from the group consisting of image data and video data.

In another embodiment of the method, method further includes but is not limited to finding key words in the multimedia data; finding visual icons data in a data base associated with key words; inserting the visual icons data into the emergency alert message, wherein the visual icons data further comprise data indicating the nature of the alert message, wherein an end user viewing the visual icons presented on an end user device during presentation of the emergency alert message are visually informed of the nature of the emergency from the visual icons. In another embodiment of the method, the longest duration for video and audio presentations for the emergency alert message in any language is used for the emergency alert message duration to ensure that multiple retransmissions of the emergency alert message to end user devices do not overlap. In another embodiment of the method, the method further includes but is not limited to storing the emergency alert message data in a data base in a computer readable media accessible to the end user device; accepting commands from the end user device, wherein the commands are selected from the group consisting of to fast forward, reverse, rewind, pause and delete the presentation of at least one of audio, video, text and visual icon data on the end user device; and performing the command at the end user device on the presentation of the emergency alert message data.

In another particular embodiment, a computer readable medium is disclosed containing a computer program of computer executable instructions that when executed by a computer perform function useful for distributing emergency alert audio data, the computer program further including but not limited to instructions to receive emergency alert message data at an encoder/decoder in an internet protocol television (IPTV) system; instructions to validate headers in the emergency alert message; instructions to send the validated emergency alert message to a emergency alert control (EAC) server in the IPTV system; instructions to verify at the EAC that a valid audio message is received in the emergency alert message; instructions to, if the emergency alert message contains an audio file, creating a MP3 audio file from the audio file; and instructions to if the received emergency alert message is a state/local alert, placing the emergency alert message in first-in-first-out order in a message delivery queue for delivery to end user devices in the order of the message delivery queue, else, instructions to if a streaming playback of state/local alert message is in progress, suspending the streaming playback of the state/local alert message, and continuously streaming the received emergency alert message to end user device in the IPTV system. In another embodiment of the medium, the computer program further including but not limited to instructions to calculate a start and stop time for delivering the audio data in emergency alert message based on the maximum time to deliver and present the audio data in emergency alert message in a language in which the emergency alert message is delivered, time to complete multicast joins for the end users receiving the emergency alert message and NTP tolerance.

In another embodiment of the medium, the audio data further includes but is not limited to multimedia data, and wherein calculating the time to deliver the audio data in the emergency alert message further includes but is not limited to calculating the duration of the multimedia message data in the emergency alert message, wherein the multimedia message further includes but is not limited to data selected from the group consisting of image data and video data. In another embodiment of the medium, the computer program further includes but is not limited to instructions to find key words in the multimedia data; instructions to find visual icons data in a data base associated with key words; instructions to insert the visual icons data into the emergency alert message, wherein the visual icons data further comprise data indicating the nature of the alert message, wherein an end user viewing the visual icons presented on an end user device during presentation of the emergency alert message are visually informed of the nature of the emergency from the visual icons. In another embodiment of the medium, the longest duration for video and audio presentations for the emergency alert message in any language is used for the emergency alert message duration to ensure that multiple retransmissions of the emergency alert message to end user devices do not overlap. In another embodiment of the medium, the computer program further includes but is not limited to instructions to store the emergency alert message data in a data base in a computer readable media accessible to the end user device; instructions to accept commands from the end user device, wherein the commands are selected from the group consisting of to fast forward, reverse, rewind, pause and delete the presentation of at least one of audio, video, text and visual icon data on the end user device; and instructions to perform the command at the end user device on the presentation of the emergency alert message data.

In another particular embodiment a system is disclosed for distributing emergency alert audio data, the system including but not limited to a processor; a computer readable medium containing a computer program of computer executable instructions that when executed by the processor perform function useful for distributing emergency alert audio data, the computer program further including but not limited to instructions to receive emergency alert message data at an encoder/decoder in an internet protocol television (IPTV) system; instructions to validate headers in the emergency alert message; instructions to send the validated emergency alert message to a emergency alert control (EAC) server in the IPTV system; instructions to verify at the EAC that a valid audio message is received in the emergency alert message; instructions to, if the emergency alert message contains an audio file, creating a MP3 audio file from the audio file; and instructions to instructions to if the received emergency alert message is a state/local alert, placing the emergency alert message in first-in-first-out order in a message delivery queue for delivery to end user devices in the order of the message delivery queue, else, instructions to if a streaming playback of state/local alert message is in progress, suspending the streaming playback of the state/local alert message, and continuously streaming the received emergency alert message to end user device in the IPTV system.

In another embodiment of the system, the computer program further including but not limited to instructions to calculate a start and stop time for delivering the audio data in emergency alert message based on the maximum time to deliver and present the audio data in emergency alert message in a language in which the emergency alert message is delivered, time to complete multicast joins for the end users receiving the emergency alert message and NTP tolerance. In another embodiment of the system, the audio data further includes but is not limited to multimedia data, and wherein calculating the time to deliver the audio data in the emergency alert message further includes but is not limited to calculating the duration of the multimedia message data in the emergency alert message, wherein the multimedia message further includes but is not limited to data selected from the group consisting of image data and video data.

In another embodiment of the system, the computer program further includes but is not limited to instructions to find key words in the multimedia data; instructions to find visual icons data in a data base associated with key words; instructions to insert the visual icons data into the emergency alert message, wherein the visual icons data further comprise data indicating the nature of the alert message, wherein an end user viewing the visual icons presented on an end user device during presentation of the emergency alert message are visually informed of the nature of the emergency from the visual icons. In another embodiment of the system, the longest duration for video and audio presentations for the emergency alert message in any language is used for the emergency alert message duration to ensure that multiple retransmissions of the emergency alert message to end user devices do not overlap.

In another embodiment of the system, the computer program further includes but is not limited to instructions to store the emergency alert message data in a data base in a computer readable media accessible to the end user device; instructions to accept commands from the end user device, wherein the commands are selected from the group consisting of to fast forward, reverse, rewind, pause and delete the presentation of at least one of audio, video, text and visual icon data on the end user device; and instructions to perform the command at the end user device on the presentation of the emergency alert message data.

Figure 1:
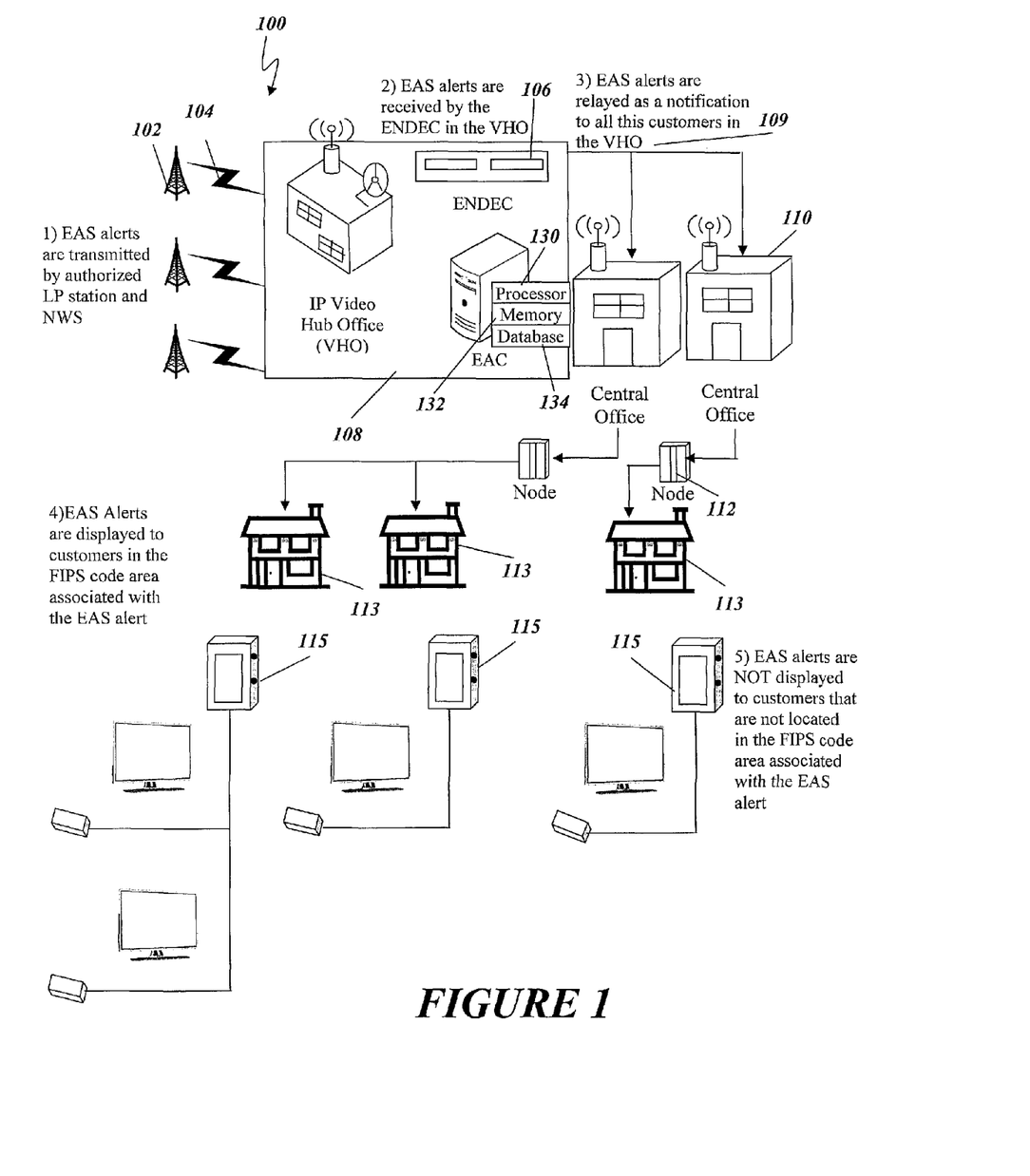
FIG. 1 depicts an illustrative embodiment of a system for delivering advertising data.

Turning now to FIG. 1, as shown in FIG. 1, in a particular illustrative embodiment 100, EAS alerts 104 are transmitted by authorized LP stations 102 and national weather service (NWS). The EAS alerts are received in the IPTV video hub office (VHO) 108 at an ENDEC. The ENDEC decodes the EAS alerts and sends them out as an EAS alert to all customers being serviced by the VHO in the VHO region. The VHO in turn, transmits the EAS alerts to the Central offices (COs) 110 serving the VHO customers. The COs then transmit the EAS alerts via IPTV nodes 112 to end user devices 115 in households 113. The EAS alerts are displayed only on end user devices in the FIPS code area associated with EAS alert. Each component (EAC, ENDEC, VHO, CO, STB, Aserver, EAS OSS API, Branch DB, Notification system and IPTV client in an illustrative embodiment as shown in the drawings includes but is not limited to a processor 130, compute readable memory 132 and database 134.

Figure 2:
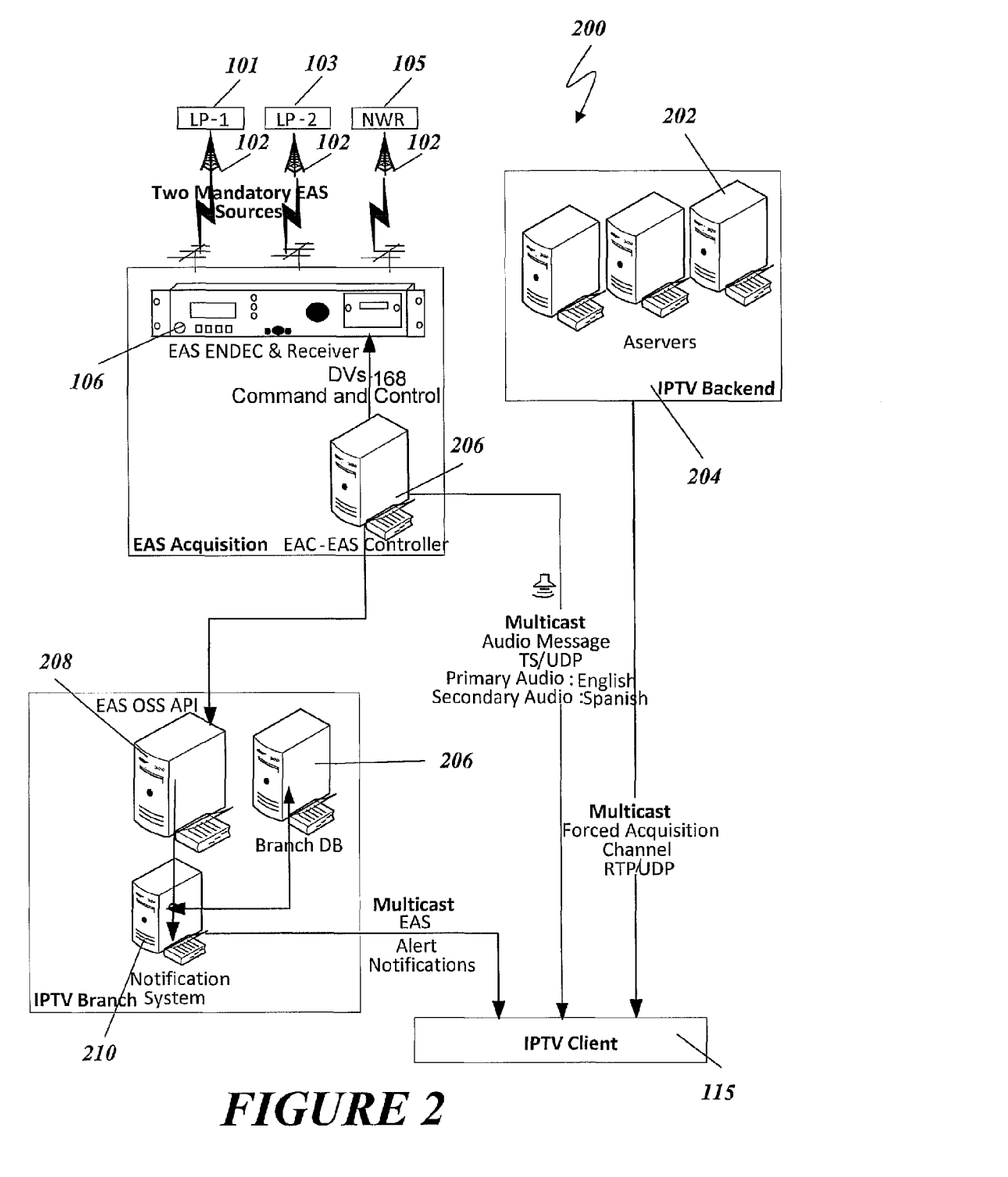
FIG. 2 depicts an illustrative embodiment of a system for delivering advertising data.

Turning now to FIG. 2, as shown in FIG. 2, in a particular illustrative embodiment, LP-1 101, LP-2 103 and/or NWR 105 generate EAS messages which are received at ENDEC 106. The EAC 206 receives the EAS message from the ENDEC and generates a plurality of audio messages in multiple languages which are each transmitted in a separate multicast to an end user device 115. The EAC sends the EAS message to an EAS application program interface in EAS OSS API 208 in the IPTV system which sends the EAS message to the notification system 210. A data base 206 stores the messages and FIPS code for each end user device. In another particular embodiment, visual icons are stored in the data and associated with key words or embedded alert codes in the EAS message which indicate the nature of the emergency. Thus, when an EAS message is received, the EAC examines the text, audio and video data in the EAS message and selects an icon associated with key words or embedded alert codes that appear in the text, audio and video data in the EAS message. In another particular embodiment, the IPTV back end servers 202 force tune the end user device to join a multicast channel delivering the EAS message.

Figure 3:
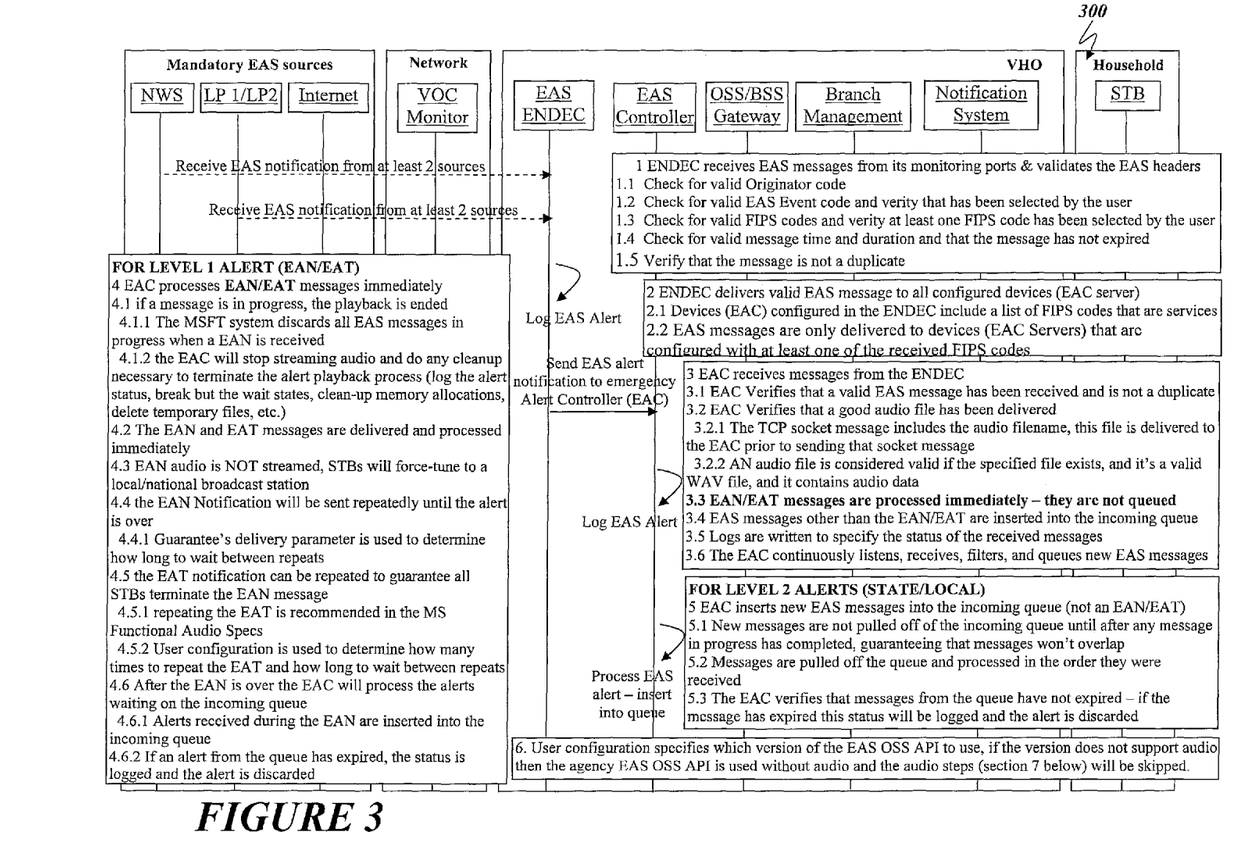
FIG. 3 depicts a flow messages and data in another illustrative method for delivering advertising data.

Turning now to FIG. 3, as shown in FIG. 3, in a particular illustrative embodiment 300, ENDEC receives EAS messages from its monitoring ports and validates the EAS headers. ENDEC then checks for a valid originator code, checks for valid EAS event code and verifies that has been selected by the user. ENDEC then checks for valid FIPS codes and verifies that at least one FIPS code has been selected by the user. ENDEC then checks for valid message time and duration and that the message has not expired. ENDEC then verifies that the message is not a duplicate. ENDEC then delivers valid EAS message to all configured devices (EAC servers) that are configured in the ENDEC include a list of FIPS codes that are services. EAS messages are only delivered to devices (EAC Servers) that are configured with at least one of the received FIPS codes.

Each EAC receives messages from the ENDEC. Each EAC then verifies that a valid EAS message has been received and is not a duplicate and verifies that a good audio file has been delivered. The TCP socket message includes the audio file name, this file is delivered to the EAC prior to sending that socket message. An audio file is considered valid if the specified file exists, and it's a valid WAV file, and it contains audio data.

In a particular illustrative embodiment, national alerts, EAN/EAT messages are processed immediately—they are not queued. EAS messages other than the EAN/EAT are inserted into the incoming queue and pulled off of the queue in first in first out order from the queue and distributed through the IPTV network. Logs are written to specify the status of the EAS received messages. The EAC continuously listens, receives, filters, and queues newly received EAS messages. The EAC processes EAN/EAT messages immediately. If a current playback is in distribution via the IPTV network of a non EAN/EAT message is in progress, the playback is ended. The system suspends all EAS messages in progress when a EAN is received as the EAC will stop streaming audio and perform any cleanup of the queue and distribution of the current message in the IPTV network to terminate the alert playback process (log the alert status, break but the wait states, clean-up memory allocations, delete temporary files, etc.). The EAN and EAT messages are delivered and processed immediately by the EAC. In another particular illustrative embodiment, the EAN audio is NOT streamed, the EAC via the IPTV network will force-tune STBs and other end user devices to a local/national broadcast station.

The EAN EAS message will be sent repeatedly until the EAN/EAT alert is over. An illustrative embodiment guarantee's delivery of the EAS message to end user devices in the IPTV network that come on line after the initial EAS message has been distributed. A duration parameter is used to determine how long to wait between repeating the EAS/EAN/EAT distribution and can be repeated to guarantee all STBs terminate the EAN message repeating the EAT. User configuration is used to determine how many times to repeat the EAT and how long to wait between repeats. After the EAN distribution period of repeating retransmissions is over, the EAC will process and EAS alerts waiting on the incoming queue. Alerts received during the EAN are inserted into the incoming queue. If an alert from the queue has expired, the status is logged and the alert is discarded.

For state and local alerts, EAC inserts new EAS messages into the incoming queue (not a national alert, EAN/EAT). During non EAN/EAT message distribution, new messages are not pulled off of the incoming EAS message queue until after any EAS message distribution in progress has completed, guaranteeing that messages won't overlap. Messages are pulled off the EAS message queue and processed in the order they were received. The EAC verifies that messages from the queue have not expired—if the message has expired this status will be logged and the alert is discarded. User configuration specifies which version of the EAS OSS API to use, if the version does not support audio then the agency EAS OSS API is used without audio and the audio steps are skipped.

Figure 4:
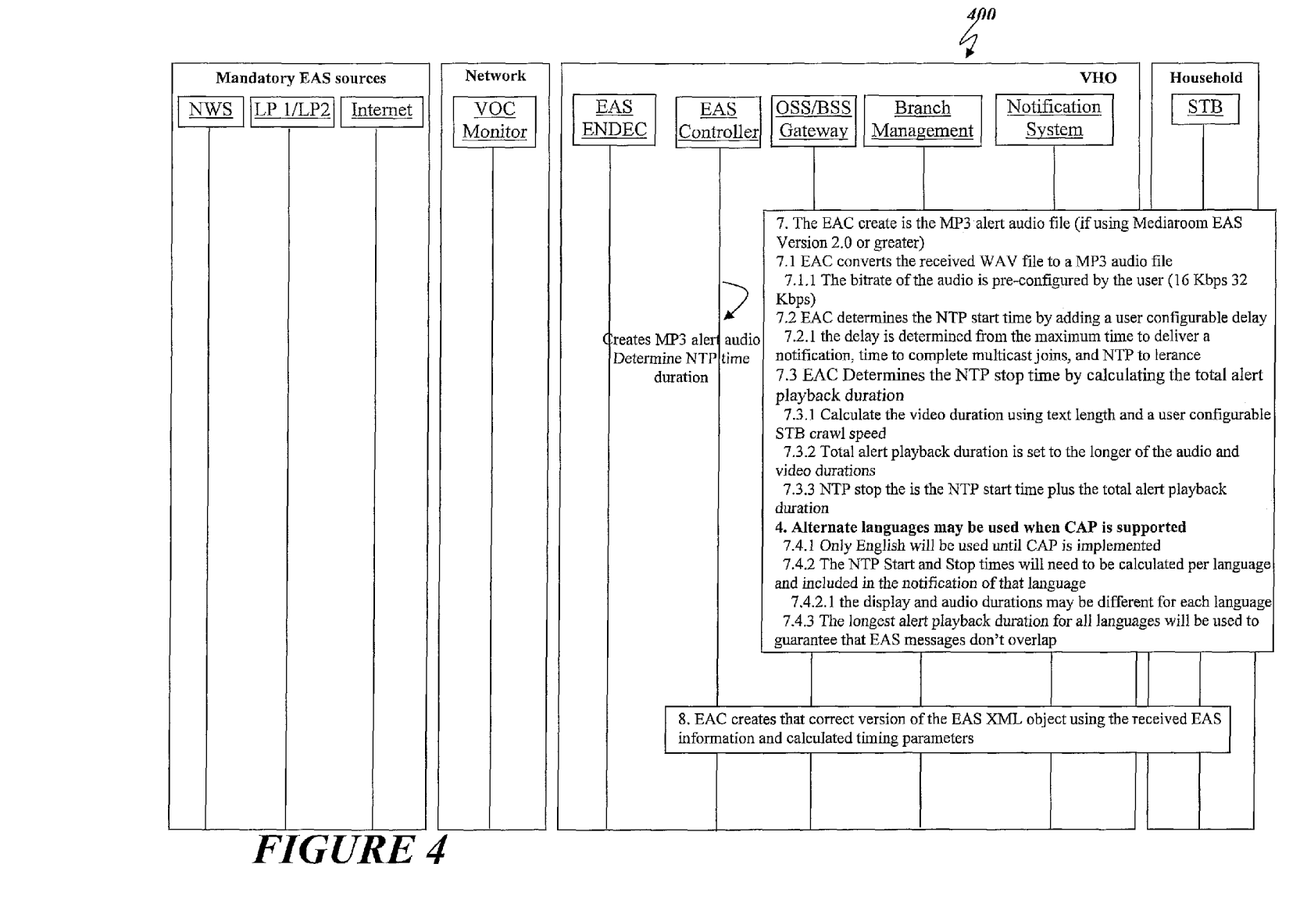
FIG. 4 depicts a flow messages and data in another illustrative method for delivering advertising data.

Turning now to FIG. 4, as shown in FIG. 4, in a particular illustrative embodiment 400, the EAC creates an MP3 alert audio file from a audio file received as a WAV file. The EAC converts the received WAV file to a MP3 audio file. The bit rate of the audio is pre-configured by the user (16 Kbps, 32 Kbps). The EAC determines the NTP start time by adding a user configurable delay. The delay is determined from the maximum time to deliver a notification, time to complete multicast joins, and NTP tolerance. The EAC determines the NTP stop time by calculating the total alert playback duration and calculates the video duration using text length and a user configurable STB crawl speed for displaying the text. In a particular illustrative embodiment, the incoming EAS message is stored in memory at the end user device and an end user is allowed to use an IPTV remote control or other remote control on their end user device to play, pause, replay, fast forward and rewind, and scroll back and forth through the EAS message data including but not limited to audio data, video data, text data and visual icon data to control the display of visual data and presentation of audio data from the EAS message.

Total alert playback duration is set to the longer of the audio and video durations. The NTP stop is the NTP start time plus the total alert playback duration. In another particular embodiment, alternate languages are used. In another particular embodiment, visual icons data are inserted into the EAS message to indicate the nature of the emergency message for persons, who due to language barriers or hearing impairment cannot hear the audio or read the text of an emergency alert message. The NTP Start and Stop times are calculated per language and included in the notification of that language. The message display and audio presentation durations may be different for each language. The longest alert playback duration for all languages can used to guarantee that EAS messages don't overlap. EAC creates that correct version of the EAS XML object using the received EAS information and calculated timing parameters. In another embodiment, the NTP start and stop times are calculated for each language and the message duration and repeat times are different for each language.

Figure 5:
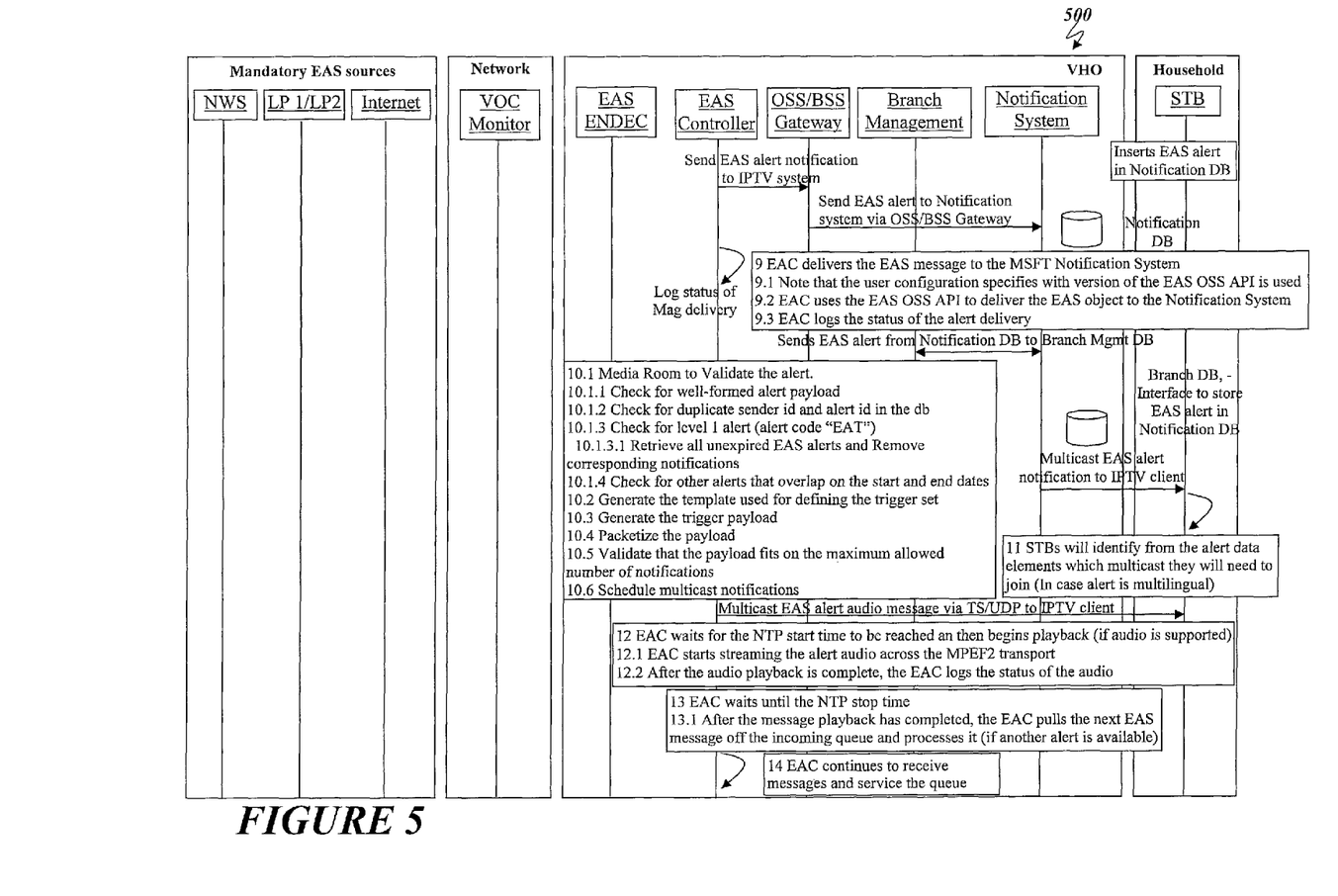
FIG. 5 depicts a flow messages and data in another illustrative method for delivering advertising data.

Turning now to FIG. 5, in a particular illustrative embodiment 500, the EAC delivers the EAS message to the Notification System. Note that the user configuration specifies which version of the EAS OSS API is used. EAC uses the EAS OSS API to deliver the EAS object to the Notification System. EAC logs the status of the alert delivery. EAC Checks for a well-formed alert payload; checks for duplicate sender identifiers and alert identifiers in the db; checks for level 1 alert (alert code "EAT") and retrieves all unexpired EAS alerts and remove corresponding notifications.

The EAC further checks for other alerts that overlap on the start and end dates and generates a template used for defining the message distribution parameter data including but not limited to trigger set data defining start and stop times for message distribution from the IPTV network. The EAC generates the trigger payload, places the payload in packets, validates that the payload fits on the maximum allowed number of notifications; and schedules multicast notifications to send EAS messages to the end user devices. In another particular embodiment, STBs will identify from the alert data elements which indicates to end user devices which of a plurality of multicasts they will need to join in the case of multilingual alerts in which case there is a separate multicast for each language. The EAC waits for the NTP start time to be reached and then begins playback (if audio is supported). The EAC starts streaming the alert audio across the MPEF2 transport. After the audio playback is complete, the EAC logs the status of the audio. EAC waits until the NTP stop time. After the message playback has completed, the EAC pulls the next EAS message off the incoming queue and processes it (if another alert is available). The EAC continues to receive messages and service the queue.

Figure 6:
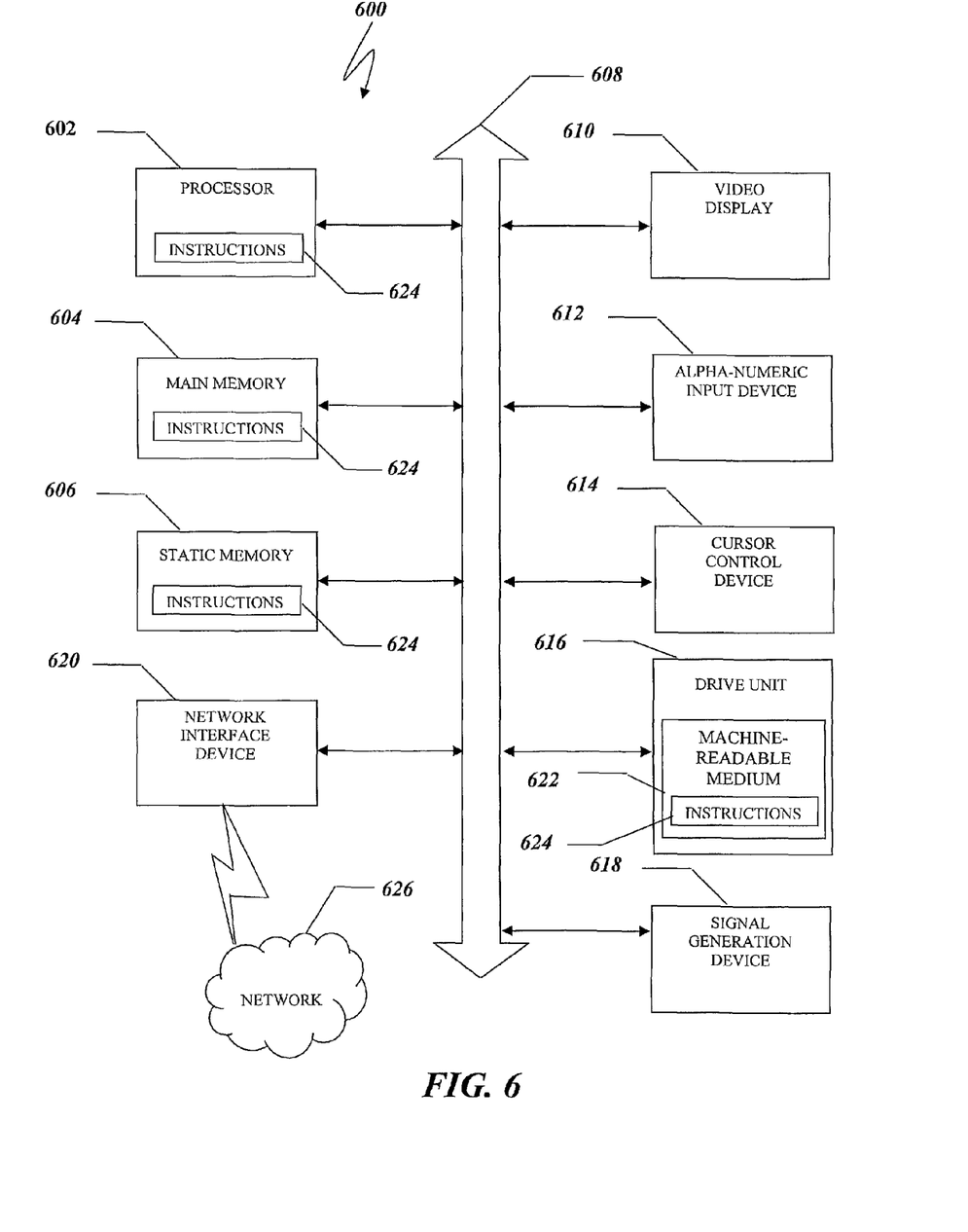
FIG. 6 is an illustrative embodiment of a machine for performing functions disclosed in an illustrative embodiment.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620. The machine readable medium may also contain a data structure for containing data useful in providing a functional relationship between the data and a machine or computer in an illustrative embodiment of the disclosed system and method.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method for distributing emergency alert audio data, the method comprising:

receiving emergency alert message data at an encoder/decoder in an internet protocol television (IPTV) system;
validating headers in the emergency alert message data;
sending the validated emergency alert message to an emergency alert control (EAC) server in the IPTV system;
verifying at the emergency alert control that a valid audio message is received in the emergency alert message data;
if the emergency alert message data contains an audio file, creating a MP3 audio file from the audio file; and
if the emergency alert message data is one of a state and local alert, placing the emergency alert message data in first-in-first-out order in a message delivery queue for delivery to end user devices in the order of the message delivery queue,
else, if a streaming playback of one of a state and local alert message is in progress, suspending the streaming playback of the one of a state and local alert message, and continuously streaming the received emergency alert message to end user device in the internet protocol television system,
the method further comprising:
calculating a start and stop time for delivering the audio data in emergency alert message data based on a time required to deliver and present the audio data in emergency alert message in a language in which the emergency alert message is delivered, time to complete multicast joins for the end users receiving the emergency alert message data and network time protocol tolerance, wherein the audio data further comprises multimedia data, and wherein calculating the time to deliver the audio data in the emergency alert message further comprises calculating the duration of the multimedia message data in the emergency alert message, wherein the multimedia message further comprises data selected from the group consisting of image data and video data;
finding key words in the multimedia data;
finding visual icons data in a data base associated with key words; and
inserting the visual icons data into the emergency alert message, wherein the visual icons data further comprise data indicating the nature of the alert message.

2. The method of claim 1 wherein a longest duration for video and audio presentations for the emergency alert message in any language is used for an emergency alert message duration to ensure that multiple retransmissions of the emergency alert message data to end user devices do not overlap.

3. The method of claim 2, the method further comprising:
storing the emergency alert message data in a data base in a non-transitory computer readable media accessible to the end user device;
accepting commands from the end user device, wherein the commands are one of to fast forward, reverse, rewind, pause and delete the presentation of at least one of audio, video, text and visual icon data.

4. A non-transitory computer readable medium containing a computer program of computer executable instructions that when executed by a computer perform function useful for distributing emergency alert audio data, the computer program further comprising:
instructions to receive emergency alert message data at an encoder/decoder in an internet protocol television (IPTV) system;
instructions to validate headers in the emergency alert message data;
instructions to send the validated emergency alert message to an emergency alert control server in the IPTV system;
instructions to verify at the emergency alert control that a valid audio message is received in the emergency alert message data;
instructions to, if the emergency alert message contains an audio file, create a MP3 audio file from the audio file; and
instructions to if the emergency alert message data is one of a state and local alert, placing the emergency alert message in first-in-first-out order in a message delivery queue for delivery to end user devices in the order of the message delivery queue, else, instructions to if a streaming playback the one of a state and local alert message is in progress,
instructions to suspend the streaming playback of the state/local alert message, and instructions to continuously stream the received emergency alert message to end user device in the internet protocol television system; instructions to calculate a start and stop time for delivering the audio data in emergency alert message based on a time required to deliver and present the audio data in emergency alert message in a language in which the emergency alert message is delivered, time to complete multicast joins for the end users receiving the emergency alert message data and network time protocol tolerance; wherein the audio data further comprises multimedia data, and wherein calculating the time to deliver the audio data in the emergency alert message further comprises instructions to calculate the duration of the multimedia message data in the emergency alert message, wherein the multimedia message further comprises data is one of image data and video data; instructions to search for key words in the multimedia data; instructions to search for visual icons data in a data base associated with keg words; and instructions to insert the visual icons data into the emergency alert message, wherein the visual icons data further comprises data indicating the nature of the alert message.

5. The medium of claim 4, wherein a longest duration for video and audio presentations for the emergency alert message in any language is used for an emergency alert message duration to ensure that multiple retransmissions of the emergency alert message to end user devices do not overlap.

6. The medium of claim 5, the computer program further comprising:
instructions to store the emergency alert message data in a data base in a non-transitory computer readable media accessible to the end user device;
instructions to accept commands from the end user device, wherein the commands are one of to fast forward, reverse, rewind, pause and delete the presentation of at least one of audio, video, text and visual icon data.

7. A system for distributing emergency alert audio data, the system comprising: a processor; a non-transitory computer readable medium containing a computer program of computer executable instructions that when executed by the processor perform function useful for distributing emergency alert audio data, the computer program further comprising:
instructions to receive emergency alert message data at an encoder/decoder in an internet protocol television (IPTV) system;
instructions to validate headers in the emergency alert message data; instructions to send the validated emergency alert message to an emergency alert control server in the IPTV system;

instructions to verify at the emergency alert control that a valid audio message is received in the emergency alert message;

instructions to, if the emergency alert message data contains an audio file, creating a MP3 audio file from the audio file; and instructions to if the received emergency alert message is one of a state and local alert, placing the emergency alert message data in first-in-first-out order in a message delivery queue for delivery to end user devices in order of the message delivery queue, else, instructions to if a streaming playback of an alert message is in progress, instructions to suspend the streaming playback of the alert message, and instructions to continuously stream the received emergency alert message data to end user device in the internet protocol television system instructions to calculate a start and stop time for delivering the audio data in emergency alert message based on a time required to deliver and present the audio data in emergency alert message in a language in which the emergency alert message is delivered, time to complete multicast joins for the end users receiving the emergency alert message and network time protocol tolerance, wherein the emergency alert message data further comprises multimedia data, and wherein calculating the time to deliver the emergency alert data in the emergency alert message data further comprises calculating the duration of the multimedia message data in the emergency alert message data, wherein the multimedia message further is one of image data and video data, and instructions to find key words in the multimedia data; instructions to find visual icons data in a data base associated with key words; and instructions to insert the visual icons data into the emergency alert message, wherein the visual icons data further comprise data indicating the nature of the alert message.

8. The system of claim 7, wherein a longest duration for video and audio presentations for the emergency alert message in any language is used for the emergency alert message duration to ensure that multiple retransmissions of the emergency alert message data to end user devices do not overlap.

9. The system of claim 8, the computer program further comprising:

instructions to store the emergency alert message data in a data base in a computer readable media accessible to the end user device;

instructions to accept commands from the end user device, wherein the commands are one of fast forward, reverse, rewind, pause and delete the presentation of at least one of audio, video, text and visual icon data on the end user device.

* * * * *